(12) United States Patent
Chen et al.

(10) Patent No.: US 10,224,678 B2
(45) Date of Patent: Mar. 5, 2019

(54) ELECTRICAL PLUG

(71) Applicant: Volex plc, London (GB)

(72) Inventors: ZhiQing Chen, Singapore (SG);
ChangChun Zhao, ShenZhen (CN);
Mui Lian Jessica Toh, Singapore (SG)

(73) Assignee: VOLEX PLC, London (GB)

(*) Notice: Subject to any disclaimer, the term of this patent is extended or adjusted under 35 U.S.C. 154(b) by 0 days.

(21) Appl. No.: 15/523,770

(22) PCT Filed: Nov. 20, 2015

(86) PCT No.: PCT/US2015/062001
§ 371 (c)(1),
(2) Date: May 2, 2017

(87) PCT Pub. No.: WO2016/081909
PCT Pub. Date: May 26, 2016

(65) Prior Publication Data
US 2017/0358890 A1    Dec. 14, 2017

Related U.S. Application Data

(60) Provisional application No. 62/083,119, filed on Nov. 21, 2014.

(51) Int. Cl.
*G01D 11/24* (2006.01)
*H01R 13/66* (2006.01)
(Continued)

(52) U.S. Cl.
CPC ..... *H01R 13/6608* (2013.01); *H01R 13/6592* (2013.01); *H01R 13/6683* (2013.01);
(Continued)

(58) Field of Classification Search
CPC ........... H01R 13/6608; H01R 13/6683; H01R 13/6592; H01R 13/5025; H01R 24/78;
(Continued)

(56) References Cited

U.S. PATENT DOCUMENTS 4,797,007 A * 1/1989 Elmore, III ............ G01K 13/02
374/143
5,188,542 A * 2/1993 Ballman ................ H01R 13/58
439/465

(Continued)

FOREIGN PATENT DOCUMENTS

CN          201522882 U      7/2010
CN          103682855 A      3/2014
(Continued)

OTHER PUBLICATIONS

International Patent Application No. PCT/US2015/062001; Int'l Search Report and the Written Opinion dated Feb. 4, 2016; 13 pages.

*Primary Examiner* — Gary F Paumen
(74) *Attorney, Agent, or Firm* — Baker & Hostetler LLP

(57) ABSTRACT

An electrical plug comprises at least one temperature sensor for monitoring temperature of the electrical plug. The electrical plug further comprises a data cable that is wrapped by a shield for screening electrical noise so as to accurately capture and convey temperature data. The electrical plug further comprises a housing for receiving the at least one temperature sensor, wherein the housing is capable of being embedded in the electrical plug.

18 Claims, 8 Drawing Sheets

(51) Int. Cl.
*H01R 24/30* (2011.01)
*H01R 24/78* (2011.01)
*H01R 43/20* (2006.01)
*H01R 43/24* (2006.01)
*H01R 103/00* (2006.01)
*H01R 13/502* (2006.01)
*H01R 13/6592* (2011.01)

(52) U.S. Cl.
CPC ............ *H01R 24/30* (2013.01); *H01R 24/78* (2013.01); *H01R 43/20* (2013.01); *H01R 43/24* (2013.01); *G01D 11/245* (2013.01); *H01R 13/5025* (2013.01); *H01R 2103/00* (2013.01)

(58) Field of Classification Search
CPC ........ H01R 24/30; H01R 43/24; H01R 43/20; H01R 2103/00; G01D 11/245
USPC .......................................... 439/604, 606, 910
See application file for complete search history.

(56) References Cited

U.S. PATENT DOCUMENTS

| | | | | |
|---|---|---|---|---|
| 5,362,249 A * | 11/1994 | Carter | ................ | H01R 13/6271 439/181 |
| 5,662,484 A * | 9/1997 | Blanche | ................ | H01R 13/04 439/106 |
| 5,749,656 A * | 5/1998 | Boehm | ................ | G01K 7/22 338/28 |
| 6,419,505 B1 * | 7/2002 | Waible | ................ | H01R 13/504 439/106 |
| 6,588,931 B2 * | 7/2003 | Betzner | ................ | G01K 7/22 338/22 R |
| 6,802,741 B1 * | 10/2004 | Shatkin | ................ | H01R 13/7137 200/51 R |
| 6,910,920 B2 * | 6/2005 | Su | ................ | H01R 13/4223 439/106 |
| 7,666,033 B1 * | 2/2010 | Fung | ................ | H01R 13/7137 439/620.26 |
| 7,677,916 B2 * | 3/2010 | Chang | ................ | H01R 4/029 439/490 |
| 8,029,318 B2 * | 10/2011 | Namiki | ................ | H01R 24/30 439/106 |
| 8,277,250 B2 * | 10/2012 | Suzuki | ................ | H01R 13/504 439/604 |
| 9,373,918 B2 * | 6/2016 | Kawai | ................ | H01R 13/582 |
| 9,634,438 B2 * | 4/2017 | Chaumeny | ......... | H01R 13/6683 |
| 2004/0008532 A1 | 1/2004 | Asawa | | |
| 2005/0024877 A1 | 2/2005 | Frederick | | |
| 2005/0197010 A1 * | 9/2005 | Ching | ................ | H01R 13/5216 439/606 |
| 2009/0068893 A1 * | 3/2009 | Busse | ................ | H01R 29/00 439/620.22 |
| 2015/0171568 A1 * | 6/2015 | Kawamoto | ......... | H01R 13/6683 439/620.08 |
| 2016/0104978 A1 * | 4/2016 | Chaumeny | ......... | H01R 13/6683 439/620.22 |
| 2016/0126681 A1 * | 5/2016 | Kawai | ................ | H01R 13/582 439/620.21 |

FOREIGN PATENT DOCUMENTS

| | | |
|---|---|---|
| CN | 203553507 U | 4/2014 |
| JP | 2002-352635 A | 12/2002 |
| JP | 4031026 B1 | 1/2008 |

* cited by examiner

ELECTRICAL PLUG

CROSS-REFERENCE TO RELATED APPLICATIONS

This application is a National Stage Application filed under 35 U.S.C. § 371 of International Application No. PCT/US2015/062001, filed Nov. 20, 2015, which claims benefit under 35 U.S.C. § 119(e) of Provisional U.S. patent application No. 62/083,119, filed Nov. 21, 2014. The contents of both applications are incorporated herein by reference in their entirety.

TECHNICAL FIELD

The present disclosure relates to an electrical connector, and more particularly to an electrical plug including one or more temperature sensors.

BACKGROUND

Electrical plugs are commonly used to supply power to electrical appliances, such as electric toasters and kettles. Conventional electrical plugs typically do not include protective mechanisms, and may be subject to overheating, melting, or burning. As a result, conventional electrical plugs may become damaged and may cause unsafe conditions. There is thus a need for improvements to conventional electrical plugs.

SUMMARY

In accordance with an aspect of the present disclosure, there is provided an electrical plug which comprises at least one temperature sensor embedded in the plug for detecting temperature of the plug. The electrical plug further comprises a data cable wrapped by a shield for screening electric noise so as to accurately capture and convey temperature data from the at least one temperature sensor. The electrical plug further comprises a housing for containing the at least one temperature sensor.

The electrical plug comprises two thermistors wherein one thermistor is disposed adjacent to a live pin of the plug and another thermistor is disposed adjacent to a neutral pin of the plug. The housing for containing thermistors includes at least one snap joint for removably locking a cover portion and a base portion of the housing together. The electrical plug further comprises a snap-fit mechanism for removably attaching the housing to a pin bridge of the plug.

Alternatively, the housing for containing thermistors may comprise a ceramic housing which includes two pin receptacles and two thermistor receptacles, wherein the two pin receptacles and the two thermistor receptacles are arranged in a line and the two thermistor receptacles are disposed between the pair of pin receptacles. A thermally conductive adhesive may be filled into the gap between the thermistor receptacles and their respective thermistors so as to maintain a tight contact and reduce thermal resistivity, thereby ensuring stable performance of the thermistors during a predicted life time.

In accordance with a second aspect of the present disclosure, there is provided a method of assembling an electrical plug which comprises the steps of inserting at least one temperature sensor into a housing and embedding the housing containing the at least one temperature sensor in the plug. The method further comprises the steps of forming an inner-mold around the housing containing the at least one temperature sensor and forming an over-mold over the inner-mold.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

The present disclosure describes an improved electrical plug that is capable of accurately monitoring temperature of the electrical plug and conveying temperature data to a controller. Once the temperature of the electrical plug passes a predetermined threshold, the plug is configured to automatically cut off an electric circuit so as to avoid damaging the electrical plug and creating unsafe conditions.

While embodiments of type B plugs used in North America are illustrated in the figures and described herein, it is to be understood that the present disclosure is not limited to type B plugs. As noted, electrical plugs in the present disclosure can be plugs of any voltage standard as well as plugs supporting two or more voltage standards. The electrical plugs can be any shape, size, and type, such as type A and C-N.

Figure 1:
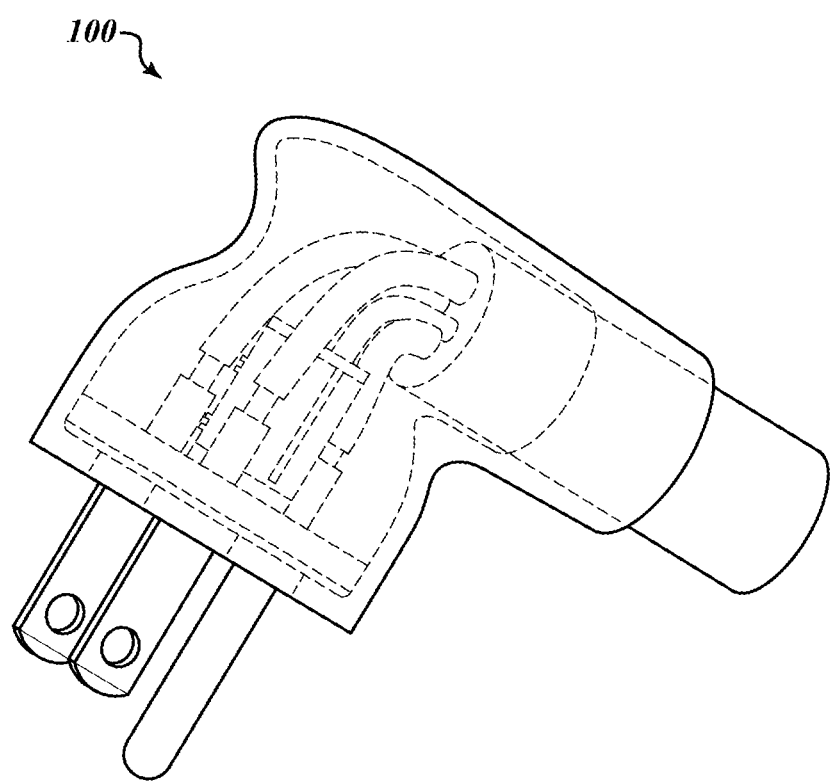
FIG. 1 illustrates a partially translucent electrical plug including thermistors in accordance with the present disclosure.
Figure 2:
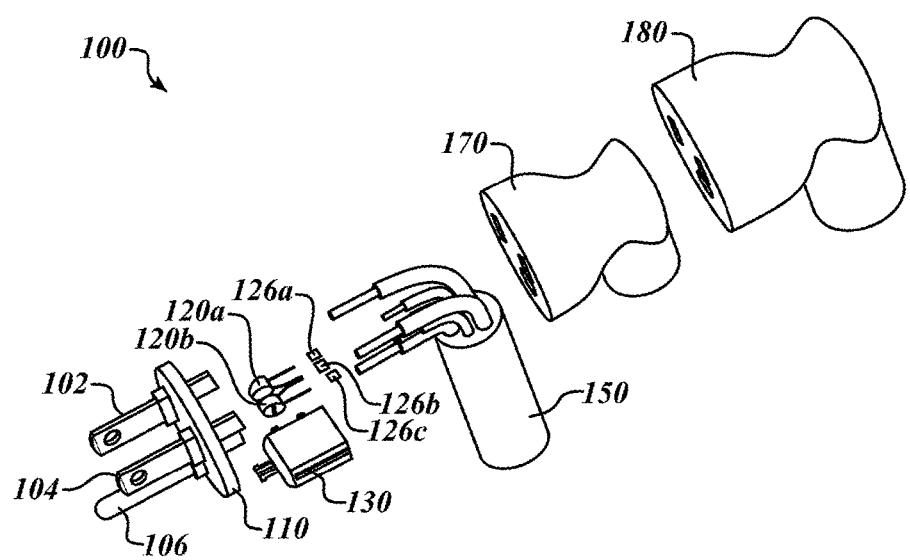
FIG. 2 is an exploded perspective view of an electrical plug including thermistors in accordance with the present disclosure.

FIG. 1 illustrates an embodiment of an electrical plug 100 according to the present disclosure. As shown more particularly in FIG. 2, the electrical plug 100 may include a live pin 102, a neutral pin 104, an earth pin 106, a pin bridge 110, thermistors 120a and 120b (collectively 120), fastening members 126a,126b, and 126c (collectively 126), a housing 130, a cable 150, an inner-mold 170, and an outer-mold 180. The inner-mold 170 and the outer-mold 180 of the electrical plug 100 may be partially translucent so as to make it possible to see the other components inside the plug 100. The pins 102, 104, 106 may be made of any suitable electrically conductive materials, such as copper or brass. The pins 102, 104, and 106 may be electrically coupled to their respective conductors in the cable 150. The pins 102, 104, and 106 may be fixed in the pin bridge 110. The pin bridge 110 may be made of any suitable insulation materials, such as plastics.

Figure 3:
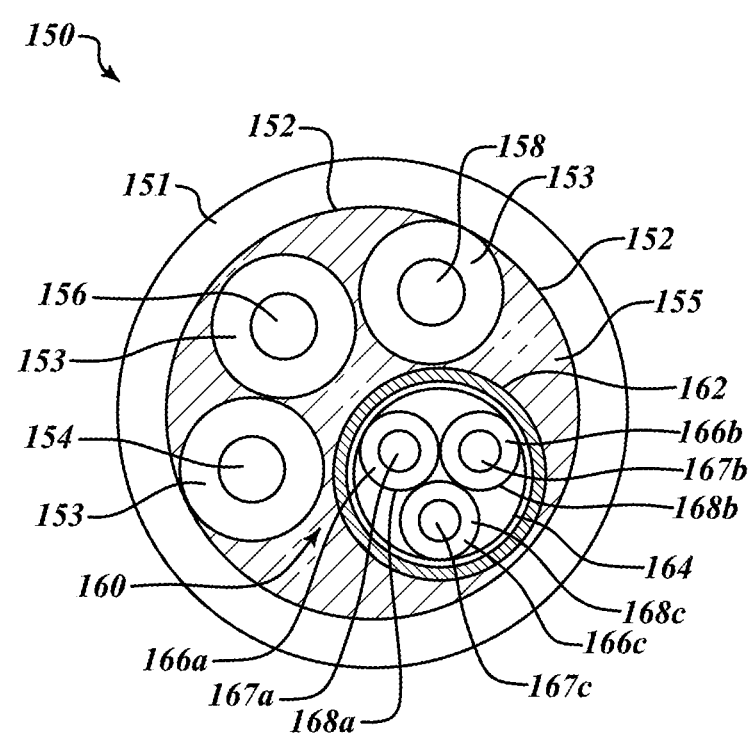
FIG. 3 is a cross-sectional view of a cable in accordance with the present disclosure.

The thermistors 120a and 120b may be coupled to a data section 160 of the cable 150 (as shown in FIG. 3) so as to accurately convey temperature data to a temperature controller installed in an appliance (not shown). The fastening members 126 may be used to fasten electrodes of the thermistors 120 to corresponding data cords of the data section 160. The thermistors 120 may be of any type of, such as bead thermistors and disc thermistors. The thermistors 120 may be received in the housing 130 which can be embedded in the plug 100. The housing 130 may be removably attached to the pin bridge 110. The features of the housing 130 will be further described below.

While thermistors 120 are illustrated in the drawings and described herein, it should be appreciated that the illustrated thermistors 120 are not limiting in any way. The present disclosure is not limited to the use of thermistors and other suitable temperature sensors with certain precision may be used. Likewise, it should be understood that the number of the thermistors 120 is not limited to two and may be any other number, such as one and three.

FIG. 3 depicts a cross-sectional view of the cable 150 according to an exemplary embodiment of the present disclosure. The cable 150 includes a jacket 151, a first sheath 152, a power section 153, and the data section 160. The power section 153 and the data section 160 may be enclosed within the first sheath 152. The jacket 151 may be wrapped around the first sheath 152. The jacket 151 and the first sheath 152 may be made of any suitable insulating materials, such as plastics. The power section 153 includes a first conductor 154, a second conductor 156, and a third conductor 158. The conductors 154, 156, and 158 may be coupled to the pins 102, 104, and 106, respectively, so as to transmit electrical power. Each of the conductors 154, 156, or 158 may be surrounded by a layer of insulating material. Fillers 155 may be disposed within the cable 150 so as to fill gaps among the insulating layers of the conductors 154, 156, 158, and the data section 160, thereby maintaining their respective positions relative to each other and adding strength to the cable 150. The fillers 155 may be any type, such as plastic filler and paper filler.

It is noted that the power section 153 described herein is not limiting in any way. The power section 153 may have any suitable structure and arrangement corresponding to a specific type of electrical plug. For instance, when the plug 100 is a type A plug which is an ungrounded plug with two flat parallel pins, the power section 153 of the cable 150 may include only two conductors for being electrically coupled to the two pins of the type A plug, respectively.

As illustrated in FIG. 3, the data section 160 may include a shield 162, a second sheath 164, a first data cord 166a, a second data cord 166b, and a third data cord 166c (collectively 166). The data cord 166a, 166b, or 166c comprises a conductor 167a, 167b, or 167c, respectively. The conductor 167a, 167b, or 167 may be surrounded by a corresponding insulation layer 168a, 168b, or 168c. The data cords 166 may be coupled to the electrodes of the thermistors 120 so as to convey temperature data from the thermistors 120 to a temperature controller. By way of example and without limitation, the temperature controller may be installed in an appliance (not shown). It should be appreciated that the number of the data conductors described herein is not limiting in any way. The number of the data conductors may vary corresponding to the number of temperature sensors embedded in the plug 100.

The data cords 166 may be enclosed within the second sheath 164. The shield 162 may be wrapped outside the second sheath 164. The shield 162 may be made of copper or other conductive materials. The shield 162 may screen electrical noise from the power section 153 and prevent electrical noise from interfering with the temperature data signal, thereby enabling the data section 160 to accurately convey temperature data. The shield 162 may be composed of braided strands of copper or other metal, a non-braided spiral winding of copper tape, or a layer of conducting polymer.

Figure 4A:
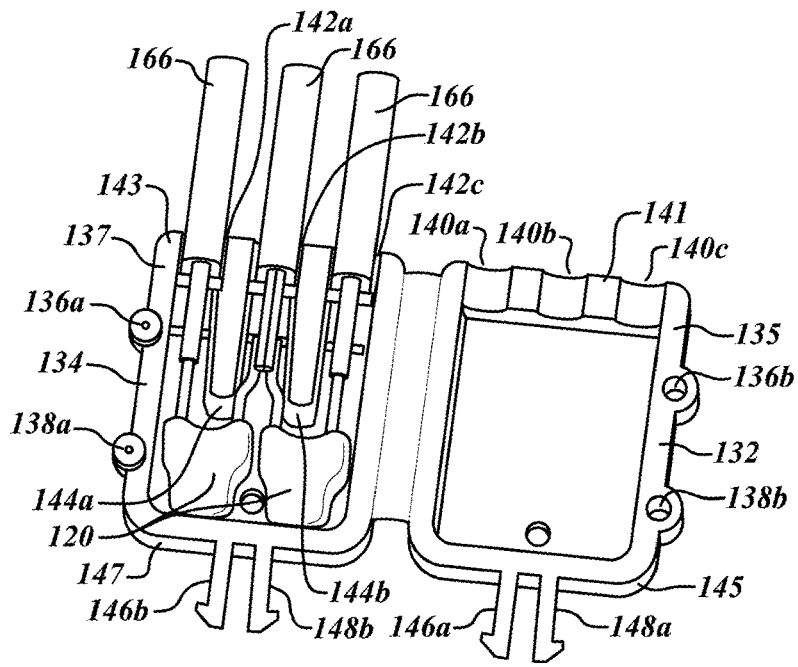
FIGS. 4A-4B are perspective views of a housing containing thermistors according to an embodiment of the present disclosure.
Figure 4B:
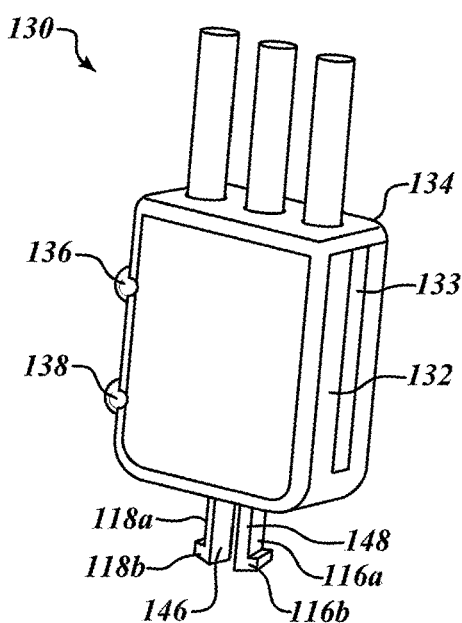

FIGS. 4A-4B illustrate an exemplary embodiment of the housing 130 for containing the thermistors 120. The housing 130 may be made of any insulating materials with a given level of flexibility, such as plastics. By way of example and without limitation, the housing 130 may be manufactured by using a plastic injection molding process. The housing 130 includes a cover portion 132, a hinge portion 133, and a base portion 134. The cover portion 132 and the base portion 134 may rotate around the hinge portion 133 so as to close or open the housing 130. The cover portion 132 comprises four side walls and a central recess. Likewise, the base portion 134 includes four side walls and a central recess. The central recesses of the cover portion 132 and the base portion 134 may be used to receive the thermistors 120 and the data cords 166.

A first snap joint 136 and a second snap joint 138 may be formed on the side wall 135 of the cover portion 132 and the side wall 137 of the base portions 134. The first snap joint 136 comprises a first protruding part 136a and a first receptacle 136b. The second snap joint 138 includes a second protruding part 138a and a second receptacle 138b. The first and second protruding parts 136a and 138a are positioned and configured so as to catch in the first and second receptacles 136b and 138b, respectively, thereby latching the cover portion 132 and the base portion 134 together when the housing 130 is closed. When the housing 130 is desired to be opened, a user may apply a force to the snap joints 136 and 138 which causes the protruding parts 136a and 138a to separate from the receptacles 136b and 138b, respectively.

In the embodiment illustrated in FIGS. 4A-4B, the protruding parts 136a and 138a are provided on the side wall 137 of the base portion 134 and their corresponding receptacles 136b and 138b are formed on the side wall 135 of the cover portion 132. In another embodiment, the protruding parts 136a and 138a may be formed on the cover portion 132, and the corresponding receptacle 136b and 138b may be provided on the base portion 134.

While the snap joints 136 and 138 are described herein, the illustrated embodiment is not limiting in any way. It should be understood that the number of snap joints is not limited to two, and the numbers may vary, such as one or three. Also, it should be appreciated that using snap joints is merely illustrative and that any other suitable structure may be used for joining the cover portion 132 and the base portion 134 together in accordance with the present disclosure.

As illustrated in FIG. 4A, the cover portion 132 includes three channels 140a, 140b, and 140c which may be formed on the back side wall 141 of the cover portion 132. The base portion 134 includes three channels 142a, 142b and 142c which may be formed on the back side wall 143 of the base portion 134. The channels 140a, 140b, and 140c of the cover portion 132 and the channels 142a, 142b and 142c of the base portion 134 may be symmetrically provided on the back side walls 141 and 143 such that three approximately round channels can be formed so as to receive the data cords 166a, 166b, and 166c when the housing 130 is closed.

Two partition walls 144a and 144b (collectively 144) may be formed in central recess of the base portion 134 and extend upward and perpendicular to the inner bottom surface of the central recess of the base portion 134. The height of the partition walls 144 may be equal to or less than a total of the depth of the central recesses of the cover portion 132 and the base portion 134 so that the cover portion 132 and the base portion 134 can fit together so as to completely close the housing 130. The back ends of the partition walls 144 may be perpendicularly attached to the inner surface of the back side wall 143. The partition walls 144 may be positioned and configured so as to approximately evenly divide the back area of the central recess of the base portion 134 into three subareas so as to receive the three data cords 166a, 166b, and 166c, respectively.

A first cantilever 146 and a second cantilever 148 may be symmetrically formed on the outside surface of the front end of the housing 130 around the vertical and horizontal centerlines of the outside surface of the front end of the housing 130. Two halves 146a and 146b of the first cantilevers 146 may extend outward and perpendicular to the outside surface of the front side wall 145 of the cover portion 132 and the outside surface of the front side wall 147 of the base portion 134, respectively. Likewise, two halves 148a and 148b of the second cantilevers 148 may extend outward and perpendicular to the outside surface of the front side wall 145 of the cover portion 132 and the outside surface of the front side wall 147 of the base portion 134, respectively.

Figure 5A:
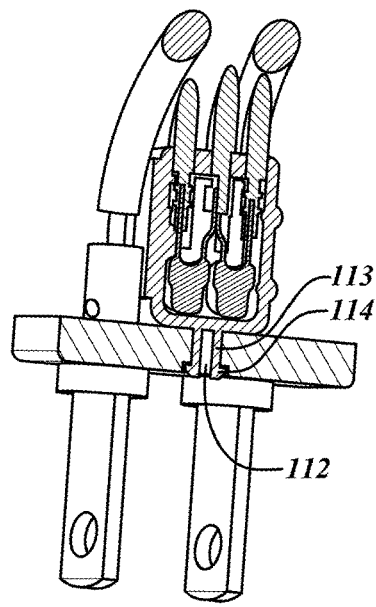
FIGS. 5A-5B are perspective views of showing a snap-fit mechanism for removably attaching a housing to a pin bridge according to an embodiment of the present disclosure.
Figure 5B:
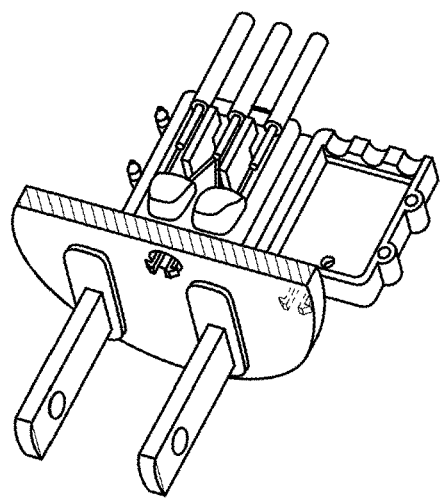
Figure 6A:
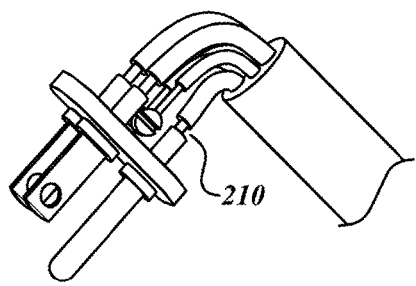
FIGS. 6A-6D illustrate a process of assembling an electrical plug including thermistors in accordance with an embodiment of the present disclosure.
Figure 6B:
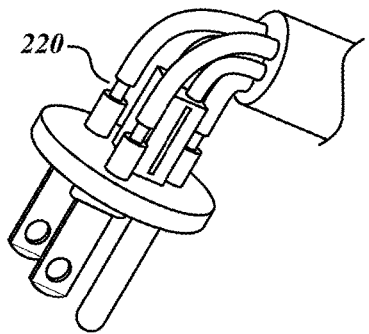
Figure 6C:
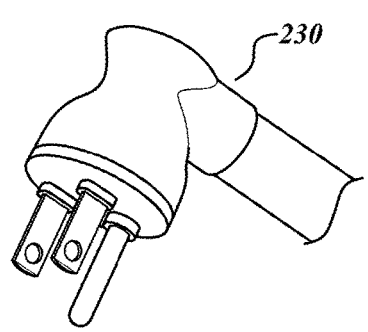
Figure 6D:
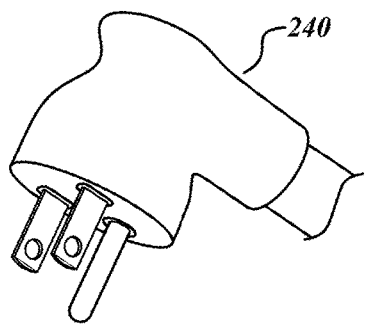

The first cantilever 146 may include a first arm 118a and a first hook 118b which may be formed at the distal end of the first arm 118a. Likewise, the second cantilever 148 may include a second arm 116a and a second hook 116b which is formed at the distal end of the second arm 116a. The pair of cantilevers 146 and 148 may be configured so as to fit into a third receptacle 112 (as shown in FIGS. 5A-5B) formed in the pin bridge 110, thereby removably attaching the housing 130 to the pin bridge 110. When the housing 130 is desired to be detached from the pin bridge 110, a user may apply an inwardly directed force to the hooks 116b and 118b which can cause the cantilevers 148 and 146 to disengage from the third receptacle 112.

Although FIGS. 4A-4B depict an exemplary embodiment of a housing for containing temperature sensors embedded in an electrical plug, those of ordinary skill in the art will appreciate that in other embodiments the depicted example may be modified. For instance, it should be appreciated that the use of the cantilevers 146 and 148 for connecting the housing 130 to the pin bridge 110 is merely illustrative and that any other suitable arrangement may be used to attach the housing 130 to the pin bridge 110, such as use of adhesive. It also should be understood that the housing is not limited to receive two thermistors, and that the housing may be modified to contain one, three, four, or more thermistors.

As shown more particularly in FIGS. 5A-5B, the third receptacle 112 may be disposed such that the housing 130 is positioned among the three pins 102, 104, and 106 when the housing 130 is attached to the pin bridge 110. Preferably, the third receptacle 112 may be disposed approximately at the center of the pin bridge 110. In another embodiment in which the plug 100 is a type A plug that has only two pins, the third receptacle 112 may be disposed such that the housing 130 is positioned slightly below or above the two pins in a vertical direction and approximately centrally between the two pins in a horizontal direction. As illustrated more particularly in FIG. 5A, the third receptacle 112 may be a stepped slit and include a narrow portion 113 and a broad portion 114. The narrow portion 113 may be configured so as to receive the first and second arms 118a and 116a. The broad portion 114 may be configured so as to receive the first and second hooks 118b and 116b. The width of the broad portion 114 may be larger than the width of the narrow portion 112.

FIGS. 6A-6D illustrate a process of assembling the electrical plug 100 according to an exemplary embodiment of the present disclosure. The assembling process may include a first step 210 of connecting electrodes of the thermistors 120 to corresponding data cords of the data section 160 by using the fastening members 126, and connecting the pins 102, 104, and 106 to corresponding conductors of the power section 153. The assembling process may include a second step 220 of installing the thermistors 120 into the housing 130, and removably attaching the housing 130 to the pin bridge 110 by fitting the pair of cantilevers 146 and 148 into the third receptacle 112. The assembling process may include a third step 230 of forming the inner-mold 170 over a portion of pins 102, 104, and 106 connected to the cable 150, the portion including the housing 130 containing the thermistors 120 connected to the data section 160 of the cable 150. The assembling process may further include a fourth step 240 of forming the outer-mold 180 over the inner-mold 170. Those of ordinary skill in the art will appreciate that any suitable means may be used to form the inner-mold 170 over the connecting portion and forming the outer-mold 180 over the inner-mold 170.

Figure 7:
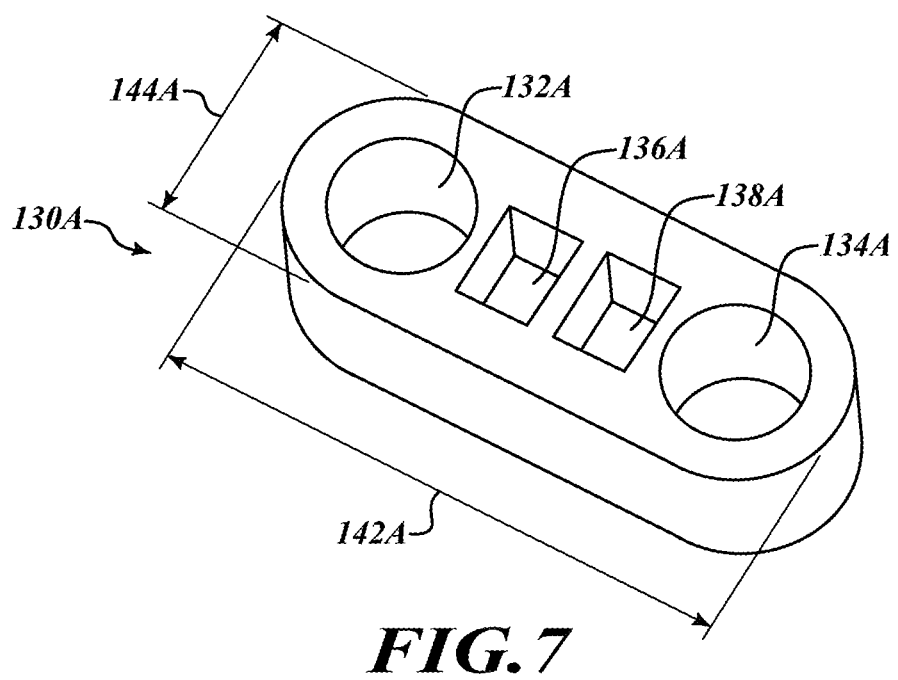
FIG. 7 is a perspective view of a housing for containing thermistors according to another embodiment of the present disclosure.

FIG. 7 illustrates a second exemplary embodiment of a housing 130A for containing thermistors. Preferably, the housing 130A may be made of ceramic. Alternatively, the housing 130A may be made of any other suitable insulating materials. The housing 130A may have an elongated shape, such as an oblong oval and an oblong rectangle. The housing 130A has a certain thickness 140A, a certain length 142A, and a certain width 144A so as to provide receptacles for receiving the pins 102 and 104 and one or more thermistors 120 and so as to be capable of being embedded in the electrical plug 100.

As shown in FIG. 7, the housing 130A includes a pair of pin receptacles 132A and 134A and a pair of thermistor receptacles 136A and 138A. The pair of pin receptacles 132A and 134A and the pair of thermistor receptacles 136A and 138A may be arranged in a line. The pair of pin receptacles 132A and 134A may be positioned and configured so as to receive the back ends of the live pin 102 and the neutral pin 104, respectively. The pair of pin receptacles 132A and 134A may be disposed adjacent to the two ends of the housing 130A. The pair of pin receptacles 132A and 134A may have the shape of a cylinder or any other suitable shape so as to receive the back ends of the live pin 102 and the neutral pin 104.

The pair of thermistor receptacles 136A and 138A may be positioned and configured so as to receive two thermistors 120, respectively. The pair of thermistor receptacles 136A and 138A may be positioned at the central portion of the housing 130A and between the pair of pin receptacles 132A and 134A. The pair of thermistor receptacles 136A and 138A may have the shape of a cube or any other suitable shape so as to receive the thermistors 120. Although FIG. 7 depicts an exemplary embodiment, those of ordinary skill in the art will appreciate that various embodiments may modify the depicted example. For instance, the number of thermistor receptacles is not limited to two, and it may be any other number, such as one or three.

Figure 8:
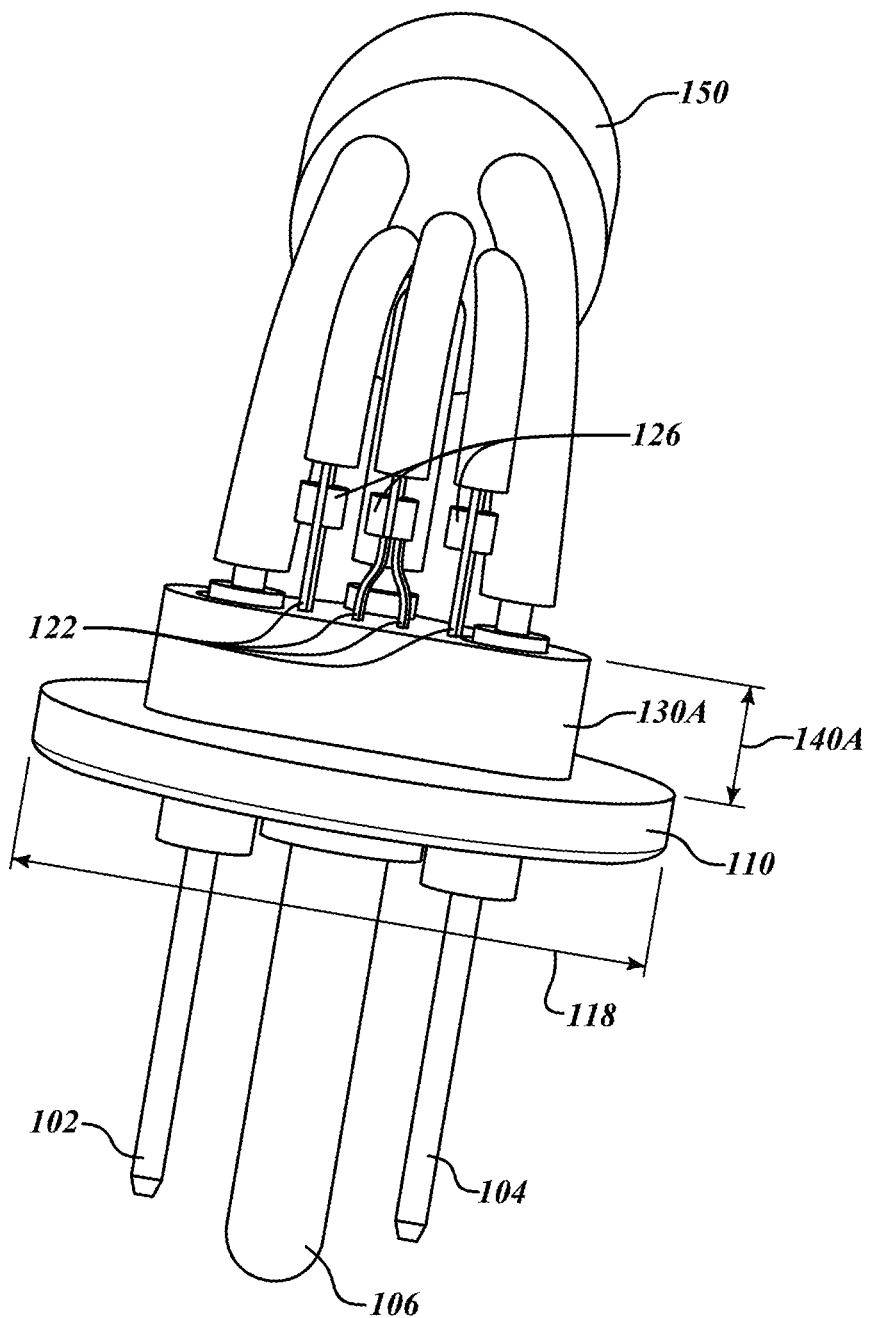
FIG. 8 illustrates an electrical plug including thermistors in accordance with another embodiment of the present disclosure.

FIG. 8 illustrates an assembling relationship of the housing 130A, the live pin 102, the neutral pin 104, the pin bridge 110, and the cable 150. The housing 130A may be attached to the back surface of the pin bridge 110 by fitting the live pin 102, the neutral pin 104, and the thermistors 120 into their corresponding receptacles 132A, 134A, 136A, and 138A. The electrodes 122 of the thermistors 120 may be connected to the corresponding data cords of the cable 150 by using the fastening member 126. The pins 102, 104, and 106 may be connected to the corresponding conductors of the cable 150.

After fitting the thermistors 120 into their corresponding receptacles 136A and 138A and connecting the electrodes 122 of the thermistors 120 to the corresponding data cords of the cable 150, a user can use any suitable thermally conductive adhesive to fill in the thermistor receptacles 136A and 138A so as to maintain tight contact between the thermistors 120 and their corresponding receptacles 136A or 138A, thereby effectively reducing thermal resistivity and ensuring stable performance of the thermistors 120 during a predicted life time. By way of example and without limitation, the thermally conductive adhesive may be Dow Corning TC-2035 heat-resistance adhesive. It should be appreciated that the use of thermally conductive adhesive is merely illustrative, and the any other suitable means may be used to achieve tight contact between the thermistors 120 and the corresponding receptacles 136A or 138A.

After fitting the live pin 102 and the neutral pin 104 into the corresponding receptacles 132A and 134A and connecting the pins 102 to the corresponding conductors of the cable 150, a user can solder the contact area between the pins and their respective receptacles so as to ensure a tight connection between the housing 130A and the pins 102 and 104 and significantly reduce thermal resistivity. It should be understood that soldering the contact area between the pins and the receptacles is merely illustrative, and that any other suitable means may be used to ensure a tight connection between the housing 130A and the pins 102 and 104. The subsequent assembling steps of forming the inner-mold 170 and the over-mold 180 may be the same as the ones described above with respect to the first exemplary embodiment of a housing 130.

While certain embodiments have been described, these embodiments have been presented by way of example only, and are not intended to limit the scope of the inventions disclosed herein. For instance, depending on various plug types, number of temperature sensors, such as thermistors, embedded in an electrical plug, configuration of the housing containing the temperature sensors, and the process for assembling the electrical plug may have variants without departing from the spirit of the present disclosure. Indeed, the present disclosure described herein may be embodied in a variety of other forms; furthermore, various omissions, substitutions, and changes in the form of the embodiments described herein may be made without departing from the spirit of the inventions disclosed herein. The accompanying claims and their equivalents are intended to cover such forms or modifications as would fall within the scope and spirit of certain of the inventions disclosed herein.

What is claimed:

1. An electrical plug, comprising:
    a mold;
    at least one temperature assembly including a first temperature sensor and a second temperature sensor for monitoring a temperature of the mold;
    a housing containing the at least one temperature assembly; and
    a data cable configured to convey data from the at least one temperature assembly to a controller;
    wherein the at least one temperature assembly and the housing are embedded in the mold so that the first temperature sensor and the second temperature sensor are disposed adjacent to corresponding pins of the mold, and wherein the housing is separate from the corresponding pins of the mold.

2. The electrical plug of claim 1, wherein the first temperature sensor and the second temperature sensor are thermistors.

3. The electrical plug of claim 2, wherein a first thermistor is disposed adjacent to a live pin of the mold, and wherein a second thermistor is disposed adjacent to a neutral pin of the mold.

4. The electrical plug of claim 1, wherein the data cable comprises a shield for screening electrical noise so as to accurately capture and convey temperature data from the at least one temperature sensor.

5. The electrical plug of claim 4, wherein the shield is composed of braided strands of copper.

6. The electrical plug of claim 1, wherein the housing comprises a cover portion, a hinge portion, and a base portion.

7. The electrical plug of claim 6, wherein the housing further comprises at least one first connecting member configured to removably join the cover portion and the base portion together.

8. The electrical plug of claim 7, wherein the at least one first connecting member comprises a protruding part and a first receptacle, and wherein the protruding part is configured to removably fit into the first receptacle.

9. The electrical plug of claim 8, further comprising a second connecting member configured to removably attach the housing to a pin bridge of the mold.

10. The electrical plug of claim 9, wherein the second connecting member comprises a pair of cantilevers formed on the housing and a second receptacle formed on the pin bridge, the pair of cantilevers configured to removably engage with the second receptacle.

11. The electrical plug of claim 1, wherein the pins of the mold include a first pin and a second pin, and wherein the housing is configured to receive an end of a first pin and an end of the second pin.

12. The electrical plug of claim 11, wherein the housing is ceramic.

13. The electrical plug of claim 11, wherein the housing has an elongated shape.

14. The electrical plug of claim 13, wherein a first pin receptacle for receiving the end of the first pin, a second pin receptacle for receiving the end of the second pin, and the housing are arranged approximately in a line.

15. The electrical plug of claim 14, wherein the housing is disposed between the first pin receptacle and the second pin receptacle.

16. The electrical plug of claim 15, wherein a thermally conductive adhesive is filled into a gap between the housing and the temperature sensor.

17. A method of assembling an electrical plug, comprising:
    assembling at least one temperature assembly into a housing;
    embedding the housing into a mold including two pins; and
    connecting the at least one temperature assembly to a data cable configured to convey temperature data from the temperature assembly wherein the at least one temperature assembly comprises a first temperature sensor and a second temperature sensor, the first temperature sensor and the second temperature sensor are disposed adjacent to corresponding pins of the two pins, and wherein the housing is separate from the corresponding pins of the mold.

18. The method of claim 17, wherein the mold includes an inner-mold and an over-mold, and wherein embedding further comprises:
   forming the inner-mold over the housing and the two pins; and
   forming the over-mold over the inner-mold.

* * * * *